Feb. 7, 1950  M. H. JOHNSON, JR  2,496,541
BRIDGE FOR MEASURING ELECTROMAGNETIC WAVE ENERGY
Filed April 18, 1944
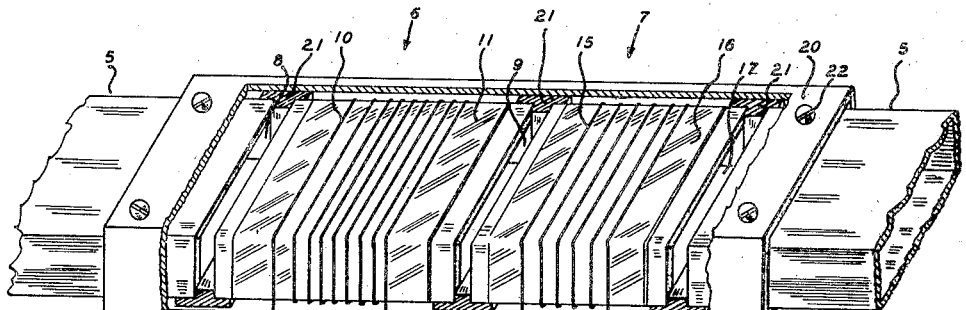
INVENTOR.
MONTGOMERY H. JOHNSON, JR.
BY
William D. Hall
Attorney

UNITED STATES PATENT OFFICE 2,496,541

BRIDGE FOR MEASURING ELECTROMAGNETIC WAVE ENERGY

Montgomery H. Johnson, Jr., Boston, Mass., assignor, by mesne assignments, to the United States of America as represented by the Secretary of War Application April 18, 1944, Serial No. 531,635

6 Claims. (Cl. 171—95)

This invention relates to an indicating system and particularly to a wattmeter for measuring power transmitted through a wave guide or coaxial line at radio frequencies.

It has hitherto been the practice to measure power transmitted in this fashion by observing the heating effect on a water load. Such a method, because of the technique and apparatus required, is restricted to a laboratory, and even then the measurements must be viewed with caution. It is well known that the character of terminating load in a wave guide or coaxial line may determine whether or not reflections occur in such line or wave guide. Hence, a water load may actually absorb a substantially different amount of power than the real load with which the transmission system is normally coupled. Also, it is clear from theoretical considerations that the water load method of measuring power is sensitive to frequency variation.

The invention hereinafter described provides a simple and effective means for measuring radio frequency power transmitted by a wave guide or coaxial line under normal operating conditions. An advantage inherent in the invention lies in the fact that the apparatus embodying the invention utilizes a negligible proportion of the radio frequency power transmitted. The invention in general depends upon the fact that the relationship between power dissipated and power transmitted by wave guide or coaxial cable is determined accurately by mathematical formulae. The variables in this relationship are the geometry of the guide or cable, resistivity there of and wave length.

Thus it may be shown that in a coaxial line where the inner conductor has a radius $b$, the outer conductor has a radius $a$ from the center to the inner surface thereof, where $\delta$ represents the depth of penetration of current into conductor and is defined as $$\sqrt{\frac{\rho}{2\pi\omega\mu}}$$

($\rho$ is resistivity of conductor ohm-centimeters, $\omega$ is $2\pi f$ and $\mu$ is the permeability of the conductor and is equal to one for most metals except the magnetic or ferrous metals) wherein $dP$ is the power lost per centimeter of length and $P$ is the transmitted power, the loss on the inner conductor is:

$$\frac{dP}{P} = \frac{\pi\delta}{\lambda_a \ln\frac{b}{a}} \quad (1)$$

wherein $\lambda$ is the free space wave length in appropriate units.

The loss on the outer conductor in the above instance is $$\frac{dP}{P} = \frac{\pi b^2 \delta}{\lambda a^2 \ln\frac{b}{a}} \quad (2)$$

It is understood, of course, that $ln$ in each equation is the natural logarithm to the base $e$.

In the case of a wave guide whose short and long dimensions are $b$ and $a$ respectively, the loss on the short side $b$ is $$\frac{dP}{P} = \frac{\pi\lambda'\delta}{2a^3} \quad (3)$$

where $\lambda'$ is the wave guide wave length and is derived as follows:

$$\lambda' = \frac{\lambda}{\left\{1-\left(\frac{\lambda}{2a}\right)^2\right\}^{1/2}}$$

The loss on all four sides of the wave guide is given by the following expression:

$$\frac{dP}{P} = \frac{\pi\lambda'\delta}{2a^3}\left[2\left(1+\frac{a}{b}\right)+\frac{a}{b}\left(\frac{\lambda}{\lambda'}-\frac{\lambda}{2a}\right)\left(\frac{\lambda}{\lambda'}+\frac{\lambda}{2a}\right)\right]$$

It is evident from Equations 1 and 2 that the power loss in a coaxial cable is inversely proportional to the square root of the wave length, while for a wave guide it is proportional to the three halves power of the wave length, providing the wave length is not too close to cutoff. It thus follows that except where a wave guide is operated near to cutoff the power loss varies rather slowly with frequency.

The above equations assume a perfect termination of the line in which case the loss is uniformly distributed along the length of the conductor. This condition, however, is the exception rather than the rule. In the event that there are standing waves, the heat developed in a conductor will be distributed along the length Z in accordance with the following relationship:

$$1+K^2+\cos\left(\frac{4\pi Z}{\lambda}+\phi\right)$$

where K is the ratio of the amplitude of the reflected wave to the amplitude of the incident wave and where $$\frac{1+K}{1-K}$$

is the standing wave ratio and $\phi$ is determined by the phase of the reflected wave. This may be found from the following line equation:

$$\frac{E}{E^+}=1+/r/\underline{/-2\phi}$$

where E is applied voltage, $E^+$ is voltage of incident wave, /r/ is absolute value of reflection coefficient and $$\underline{/-2\phi}$$

gives the vector angle. It is evident from the above expression that the distribution of heat loss varies for each half wave length but in practice the variation is negligible.

The invention in general utilizes the above power relationships by providing a test length of radio frequency transmission system. This test length will be part of a wave guide or coaxial line and has provided means for measuring the heat generated therein. By virtue of known mathematical relationship, it is thus possible to measure in an accurate manner the amount of power transmitted as the result of the actual measurement of the power dissipated as heat in such test length.

Since it is practically impossible to operate systems at high frequencies without some standing waves, it is preferred to have the test length a half wave length or multiple of half wave length. As indicated above, a variation of frequency may be tolerated to a substantial degree so that the departure of the test length from exact integral multiples of a half wave length does not impair seriously the accuracy of measurement.

Inasmuch as the power lost in a test length of the conductor is transformed into heat and is to be measured as such and since at best the amount of power involved is small, the invention provides means for insuring accuracy in the determination of such heat. Preferably the test section or length of line is divided up into two portions each one of which is preferably an integral number of half wave lengths in length. One portion of the line may be made of usual good conducting material such as copper, for example. This section is used as a standard. The other section is preferably made of a resistance material such as constantan. This resistance section has a higher heat loss than the standard section. Thus variations in room or ambient temperatures due to weather may be eliminated.

In the drawing, Fig. 1 is a partly cut-away perspective view of an embodiment of the invention applied to a rectangular wave guide, Fig. 2 is a perspective view of the device enclosed in a suitable housing, and Fig. 3 is a partly cut-away perspective view of an embodiment of the invention adapted for use with a coaxial system.

In the drawing, 5 indicates a rectangular wave guide forming part of a system through which radio frequency power is transmitted under operating conditions between a generator and its load. At any convenient point in the system, a section of guide 5 is removed, and the removed section is replaced by a structure shown in Fig. 2 and consisting of two prepared guide lengths 6 and 7, shown in Fig. 1.

Guide length 6 has the same sectional dimensions as guide 5, and a length somewhat greater than a half wave length or multiple thereof of the transmitted frequency. It is preferably made of a thin resistance material, such as constantan. Length 6 is heat insulated from guide 5 and companion length 7, the insulation shown being in the form of air gaps 8 and 9 between the respective conductors. A temperature responsive resistance material is thermally associated with guide length 6 in order to indicate temperature variations due to power dissipation in the length. This material, the resistance of which varies with temperature, may take the form of a platinum winding 10 on length 6, the length of the winding being generally a half wave length or multiple thereof. Winding 10 is electrically insulated from length 6 by a layer of heat conducting material such as Scotch tape 11 lying therebetween. Thus a temperature change in length 6 will manifest itself in a corresponding resistivity change in winding 10.

Guide length 7 likewise has the same sectional dimensions as guide 5, but in this case the length is made of generally the same conducting material as the guide so that its temperature will correspond to that of the guide. A winding 15 likewise is associated with this length, a layer of Scotch tape 16 therebetween providing electrical insulation and thermal conductivity between the two. Length 7 is heat insulated from guide 5 and associated length 6 by air gaps 17 and 9, respectively.

Guide lengths 6 and 7 may be suitably contained in a housing 20. Housing 20 has slightly larger sectional dimensions than the lengths so that the latter may be mounted therein in spaced relation to the sides of the housing. T-shaped spacer gaskets 21 support lengths 6 and 7 within the housing and thus provide an air space between the housing and the windings 10 and 15, for heat insulation. Gaskets 21 also properly space lengths 6 and 7 from each other and from the coupled ends of guide 5. Suitable retaining means, such as set screws 22, are provided in housing 20 to anchor the ends of wave guide 5 in proper spaced and aligned relation to the lengths 6 and 7 within the housing.

Windings 10 and 15, which may have their ends connected to terminals 25, 26, and 27, 28 of housing 20 (Fig. 2) are connected as the two variable resistances in a bridge circuit 30. Circuit 30 is the usual Wheatstone bridge comprising fixed resistances 31 and 32, galvanometer 33, switch 34, and a source of potential 35. Resistances 31 and 32 are preferably wound on a common core so that their temperatures will be maintained substantially equal. One lead from each winding 10 and 15 is connected to a common bridge terminal 36, the other leads being respectively connected at terminals 37 and 38 to one end of the respective resistances 31 and 32, the other ends of the resistances being connected to common terminal 39. Galvanometer 33 is connected in series with a switch 40 between terminals 36 and 39. With the bridge connected in this manner, the common temperature of either pair of resistances, i. e. windings 10 and 15 or fixed resistances 31 and 32, may be changed without disturbing the balance of the bridge. As balance depends only on the ratio of the two platinum resistances or the ratio of the fixed resistances, unbalance can result only from a temperature difference between the two platinum windings. The ratio of the fixed resistances, of course, is maintained at a constant value.

Bridge 30, connected as shown, may be balanced for zero galvanometer deflection when the two windings 10 and 15 are at substantially the same temperature, as when there is no power being transmitted in the wave guide system. With the system in operation, a power loss, manifested by a temperature rise, will occur throughout the wave guide proper and particularly in the two lengths 6 and 7. Because of the resistance nature of length 6, the temperature rise is substantially greater in that length than the rise in length 7. Therefore, the temperature responsive resistance of winding 10 in the bridge circuit will increase considerably more than the resistance of winding 15, and galvanometer 33 will show a deflection corresponding to this difference. As the temperature difference between lengths 6 and 7 and consequent difference in resistivity likewise is proportional to the power transmitted in the system, galvanometer 33 may be suitably calibrated to read directly in watts. Calibration may be accomplished by passing a known amount of direct current or low frequency current, through constantan length 6. Thus, the heating effect of a 60 cycle current of known intensity will be indicated on the resistivity of winding 10, and the galvanometer may be calibrated accordingly.

This calibration is merely to determine the thermal characteristics of the system. Thereafter final calibration in terms of radio frequency power transmitted may be accomplished in one of two ways. Thus from equations previously given, the meter may be calibrated by transforming a particular meter reading for a certain heat loss to its corresponding value of power transmitted. Since the wave length and standing wave ratio may be determined easily, this method of calibration, relying upon theoretical considerations, is perfectly reliable. However, the system as a whole may be completely calibrated in a test run using a known amount of transmitted power.

A similar device is shown in Fig. 3 applied to a coaxial transmission system. In this case, a section of coaxial line 45 comprises two spaced lengths 46 and 47 of outer conductor and continuous solid central conductor 48. Central conductor 48 is spaced within lengths 46 and 47 by means of the usual spacer beads 49, and the lengths are suitably mounted within a housing 50, annular spacers 51 maintaining the lengths in spaced relation to the housing. Length 46 is made of thin resistance material, such as constantan, and is wound with temperature responsive resistance wire 52, a layer of Scotch tape serving to electrically insulate wire 52 from the length. Conductor length 47, made of the same conducting material as the line proper, likewise is insulated and wound with resistance wire 53, the two resistance windings being connected into a Wheatstone bridge circuit, as described above. Central conductor 48 may have end recesses 55 to telescope inner conductor 56 of the associated coaxial cable. Outer conductors 57 of the coupled cable are received within housing 50, and maintained, in any desired manner, in spaced relation to the housing and to the adjacent ends of conductor lengths 46 and 47.

While it is true that losses occur in both the outer and inner conductors of a coaxial line, the loss in either of such conductors may be calibrated to indicate the total loss in both. Consequently, the temperature difference between outer conductor lengths 46 and 47 may be indicated by the Wheatstone bridge, and the galvanometer thereof calibrated to measure the total power transmitted in the system.

The actual heat losses may be measured on the inner conductor if desired. This method is somewhat more sensitive but suffers from mechanical complications.

It is understood that the series connected wave guide or coaxial cable sections are so disposed that there will be little or no radiation of power at the gaps. Thus chokes around the gaps may be provided in accordance with well known practice.

Having thus described the invention, what I claim as new and desire to secure by Letters Patent is:

1. In a high frequency transmission system comprising at least a hollow conductor enclosing a space within which high frequency electric fields exist, a power indicating means comprising two thermally discrete sections of conductor forming part of the high frequency transmission system, and means for measuring temperature rise in said sections due to high frequency transmission therethrough, said last means being calibrated to measure the power transmitted in said system.

2. The combination of claim 1 wherein one of said sections is made of a material having substantially higher resistivity than the material of which the other section is made whereby a sensible temperature rise may result.

3. In combination with a high frequency transmission system comprising at least a hollow conductor enclosing a space within which high frequency electric fields exist, the transmission of high frequency power incurring a power loss in said system, which loss is proportional to the total power being transmitted within said conductor, said combination including a power indicating means comprising two thermally discrete lengths of conductor in series forming part of the high frequency transmission system, one length being made of substantially the same material as the conductor proper, the other length being made of a material having substantially higher resistivity than said first length, and means for indicating the difference in temperature rise in the two lengths due to high frequency power dissipation.

4. The combination of claim 3 wherein said last means comprises windings of temperature responsive resistance material on each of said lengths, said windings being connected as variable resistances in a Wheatstone bridge circuit, said circuit including an indicating means responsive to the resistance difference between said windings.

5. In combination with a high frequency coaxial transmission system wherein transmission of wave energy involves a power loss in one of the conductors thereof, which loss is proportional to the total power being transmitted, a power indicating means comprising two thermally discrete conductor sections having unequal resistivity and forming part of the conductor of said coaxial system, and means for indicating the difference in temperature rise between said sections due to high frequency power dissipation in said sections, said last means being calibrated to measure the power transmitted in said system.

6. In combination, a high frequency power indicating device having two thermally discrete conductor lengths forming in series part of a high frequency transmission system, said conductor lengths being made of materials having substantially different resistivities, temperature responsive resistance windings on said lengths, a pair of resistances wound on a common core whereby the temperatures thereof will be substantially equal, connections for forming a bridge of said four resistance windings, and a galvanometer connected between the junction of said first two resistances and the junction of said second two resistances.

MONTGOMERY H. JOHNSON, Jr.

REFERENCES CITED

The following references are of record in the file of this patent:

UNITED STATES PATENTS

| Number | Name | Date |
|---|---|---|
| 992,427 | Jandus | May 16, 1911 |
| 1,957,454 | Gebhard | May 8, 1934 |
| 2,140,364 | Lee | Dec. 13, 1938 |
| 2,151,118 | King et al. | Mar. 21, 1939 |
| 2,262,134 | Brown | Nov. 11, 1941 |
| 2,314,764 | Brown | Mar. 23, 1943 |